Feb. 18, 1969 P. K. HOKKINEN 3,428,233

DRIVE MEANS FOR TAPE OR RIBBONLIKE MATERIAL

Filed May 9, 1966

INVENTOR.
PAUL K. HOKKINEN
BY Westell & Hanley

United States Patent Office 3,428,233

Patented Feb. 18, 1969

3,428,233

DRIVE MEANS FOR TAPE OR RIBBONLIKE MATERIAL

Paul K. Hokkinen, Toronto, Ontario, Canada, assignor to Ferranti-Packard Electric Limited, Toronto, Ontario, Canada, a corporation of Canada Filed May 9, 1966, Ser. No. 548,764

U.S. Cl. 226—178 3 Claims

Int. Cl. B65h *17/22, 17/44;* F16d *67/02*

ABSTRACT OF THE DISCLOSURE

A tape drive member is located between and in continuous frictional contact with two differentially rotating members. Selectable forces determine whether the tape drive member rotates at the speed of one or the other differentially rotating members. Heat dissipation is improved and inertia reduced by locating the power take-off surface of the tape drive member radially outwardly of the frictional contact areas.

Figures 1, 2:
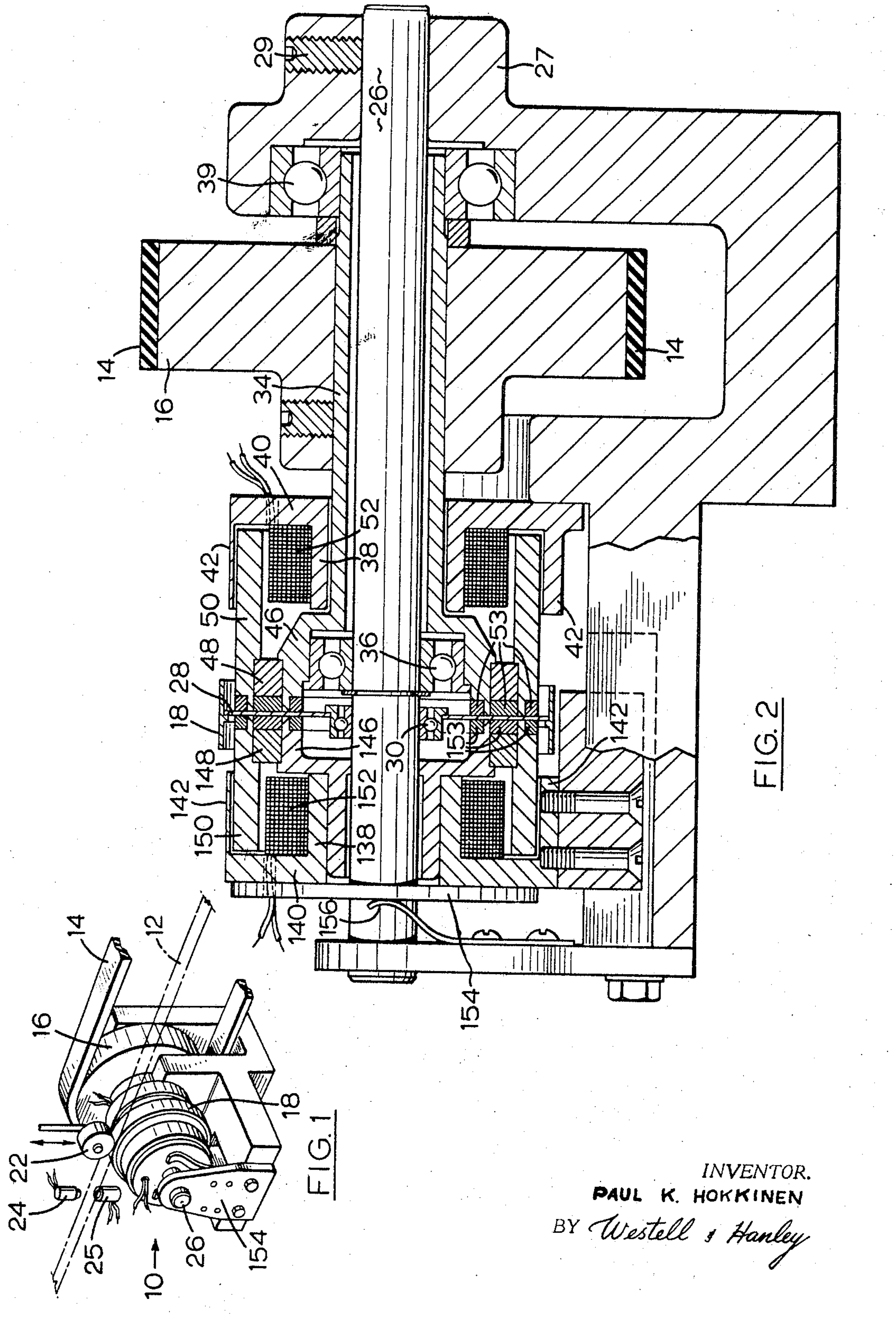

This invention relates to an improved drive for tape, film or ribbonlike material or other material which is the mechanical equivalent of punched paper tape.

The most common commercial application of applicant's development is thought to be for use with tape readers for punched paper tape wherein the presence or absence of perforations conveys information and usually where the tape is intermittently started and stopped for the benefit of a tape reader which by light or similar transmission through the holes extracts the information. The invention is not, of course, confined to this application, since the advantages of the invention relate to the mechanical drive of any tape or the like where it is desired intermittently to vary the speed of the tape or to start and stop it. Thus, for a tape reader, the information instead of being contained in perforations might be contained in magnetically recorded information; and in fact, instead of information bearing tape, the drive might be used with film or other ribbon like material which is equivalent mechanically to the tapes or ribbons or films described.

This invention although broader in scope, in one of its specific forms provides an improvement in what is commonly known as a brake-clutch drive for such tapes where, at present, a power take-off disc is located between a stationary brake element and a rotatable drive or clutch element. The brake and clutch elements are biased toward each other, with the power take-off disc therebetween so as to be in continual frictional connection therewith. (By frictional connection I include not only a continuous rubbing contact but a situation where, although the frictionally connected surfaces are slightly spaced, they are coupled due to the viscosity of a thin layer or film of a fluid having viscosity between them.) Means, which is usually electro-magnetic, but could be of mechanical or other form is used to increase the frictional coupling of the power take-off disc with the clutch, relative to the strength of the frictional connection with the brake or vice versa, and in this way control of the rate of rotation, or of rotation or not of the disc, is achieved.

In the prior art arrangements, however, the power take-off disc is connected by a shaft to a flat-sided pulley or capstan by a shaft extending for a material distance along the axis of rotation of the disc.

The disadvantage of this arrangement is that the added weight of the shaft and separate capstan add materially to the inertia of the power take-off disc, which includes the power take-off disc, the shaft and the capstan. The added inertia of the member mentioned, is a great disadvantage of present systems, since inertia and the resultant rotational lag in responding to desired changes of rotational velocity affects directly the speed at which operations, for example tape reading, which depend on intermittent velocity changes, may be performed. Such lag, almost solely due to inertia, is one of the principal disadvantages of present devices.

In addition however, the extended connection between the disc and the capstan provides a lengthy heat dissipation path whose extent is mainly internal to the mechanism which slows heat dissipation for heat generated at the power takeoff member. Further, the extended assembly of the capstan shaft and the disc, leads to a much larger and less compact assembly than is required by the more compact mechanism proposed by applicant. Further the expense and faults in correctly aligning and balancing the shaft are required with the present system, but eliminated with applicant's construction. Further expense is added to present systems because of the mechanical complexity of having to lead the shaft from the take-off disc through the centre of either the brake or the clutch to the capstan location. Further, due to such mechanical complexity, difficulty is encountered in assembly and disassembling. All this is avoided due to applicant's arrangement.

In applicant's construction, the power take-off disc (or the like as defined by the specification and claims herein) does not require connection to a shaft since the capstan or tape drive means is located on the disc or equivalent, itself radially outwardly of the rotational mounting of the disc. In this way the inertia of the shaft and of the radially outwardly extending mounting for the capstan are eliminated; in the case of the latter, because the power take-off disc itself acts as the capstan mounting. The inertia is so greatly reduced that the stopping time or change of rotational velocity time, in response to control biasing by the clutch or brake, is materially improved. Further the elimination of the connecting shaft allows for a more compact construction and for simpler engineering since there is no rotating element to pass through the centre of the clutch or of the brake. In this way space, weight and cost are reduced by the elimination of rotating shaft and separate capstan.

Further heat dissipation is assisted since the larger area of the capstan or tape drive surface is located outwardly and connected directly to the disc and thus a good heat conduction path for the heat generated by the frictional contact of brake and clutch on the disc is provided.

Further, it will be seen that the mounting of the capstan on a radially outer part of the disc greatly reduces the axial displacement of the centre of mass of the disc from the centre of mass of the capstan, and thus reduces rotational - inertial balancing problems by comparison with the former construction; and thus is true whether or not the capstan centre of mass has exactly the same axial displacement as the disc.

Although for purposes of describing the advantages and disadvantages of the invention, reference has been made to a clutch and brake, it will be realized that the two relatively rotatable control members which act on the disc, need not be confined to a rotatable and a stationary one but may be both rotating in opposite directions or both rotating in the same direction at different speeds. Further, although a disc has been described, it will be realized that the member may in fact be of any form having a surface facing approximately in each direction along its axis of rotation forming, or forming a part of a surface of revolution for frictional connection to the control members. Further, although the method of controlling the frictional connection to the two differentially rotating control members is usually electromagnetic, it will be realized that this can be achieved by other means including mechanical bias applied by the control members to the disc. Further, it will be realized, as previously explained, that the invention is not confined to use with punched paper tape, but may in fact be used with anything mechanically equivalent thereto, including: magnetic tapes, films, wrapping tapes, or ony other tape film or ribbon-like material.

In drawings which illustrate the preferred embodiment of the invention:

FIGURE 1 indicates schematically, the invention in use; and

FIGURE 2 shows a cross section of a brake clutch drive incorporating the invention.

In FIGURE 1 it is seen that a clutch-brake drive 10 in accord with the invention, is located along a desired travel path of some punched paper tape 12. The power input in the embodiment shown is by means of a belt 14 to a pulley 16 which acts to rotate the clutch of the clutch-brake drive. The power take-off portion of the apparatus shown includes a capstan 18 and the tape 12 is directed, by means not connected with the invention, to travel between the capstan 18 and a "pinch roller" 22 which may be controllably brought into and out of bearing pressure on the tape and capstan to achieve the desired frictional drive by the capstan of the tape. Thus, in accord with conventional installation, when it is desired that the tape 12 move in accord with the travel of the capstan, then the pinch roller 22 is lowered into pressure bearing relationship therewith, and when it is desired that the tape 12 stop or move independently of the motion of the capstan 18 then the pinch roller pressure is released. Where the application is for use with a tape reader for punched paper tape, then the mechanism described will usually have located adjacent thereto, a means for extracting the information from the tape perforations, such as schematically shown as a light source 24 and a photo cell 25, both being assumed to be connected to detecting and/or recording apparatus.

In FIGURE 2 is shown a frame 27 for mounting the apparatus to be described and for mounting on any desired support. Mounted in the frame 27 such as by set screw 29 is a stationary shaft 26 for a purpose to be hereinafter described. Mounted on the stationary shaft by the bearings 30 shown, for rotation in relation thereto, is a power take-off member 28 having on each side faces shaped to achieve sliding frictional contact by relatively rotating parts on the same rotational axis. In the preferred embodiment, the power take-off member is a simple disc 28 with the frictionally contactable faces on opposite sides but it will be realized that the disc will, in some embodiments, be two spaced co-rotating discs with a spacing member therebetween, or may be a single body or may be of composite construction although it will usually be as light and lacking in inertia as possible and will have the two oppositely facing surfaces each forming part of a surface of revolution. Another example which the form of the disc may take is that sections of the surface of revolution may be omitted, for lightness, leaving spoke-like members whose opposed surfaces form part of the surface of revolution. Mounted on the power take-off member (here the disc 28) radially outwardly of the frictionally contactable faces of the disc is the tape drive capstan 18 having its radially outwardly facing surfaces suitably shaped for a tape to pass thereover and adapted to frictionally drive a tape 12 passing thereover under the applied pressure of a pinch roller 22 (see FIGURE 1). The capstan surface will preferably but not necessarily be centered, when viewed transversely to the axis of rotation, on the disc or on the power take-off member.

The stationary shaft 26 mounts the rotatable power input or clutch member which comprises a rotatable sleeve 34 mounted rotatably on the shaft 26 at its end adjacent disc 28 by bearings 36 and on the frame 27 at its end remote from disc 28 by bearings 39. Extending annularly about sleeve 34 but stationarily mounted on the frame, is an electromagnetic core member comprising a core sleeve 38 surrounding the rotatable sleeve 34 and spaced as short a distance as possible therefrom, since such space will form an air gap in an electromagnetic circuit. The electromagnetic core member extends radially outward from the end of core sleeve 38 remote from disc 28 and spaced outwardly along such extension 40 is a cylindrical flange 42 extending from extension 40 toward disc 28. The rotatable member is designed to provide, with said core member, an electromagnetic circuit including the disc 28. Thus the core sleeve 38 is formed of electromagnetic material and, adjacent the disc 28, is extended in a boss 46 there-towards about bearing 36 to a face in close proximity to disc 28 so as to leave a narrow air gap in the electromagnetic circuit. Non-magnetic material 48 is mounted surrounding boss 46 and radially outwardly thereon is a cylinder 50 of magnetic material extending from close proximity to disc 28 to close proximity and just inwardly of flange 42. An energizing winding 52 is wound on core sleeve 38 to be energized, when desired, by a source, not shown. When winding 52 is energized magnetic flux travels through the path defined by: the core sleeve 38, the rotating sleeve 34, boss 46, disc 28, cylinder 50, flange 42, extension 40 and back to core sleeve 38. When winding 52 is energized disc 28 is pulled by the magnetic force toward boss 46, non-magnetic material 48 and cylinder 50 to tend to cause the disc 28 to be rotated by the rotational power input member. Frictional engagement between the rotational power input member and disc 28 is assisted by facing members 53 of frictional material located on the disc adjacent faces of members 46, 48 and 50.

On the other side of the disc 28 from the clutch member is the brake assembly which is magnetically similar to the clutch assembly although the brake does not rotate.

The brake assembly therefore comprises a magnetic core sleeve 138 with radial extension 140 remote from disc 28, and a flange 142 projecting inwardly toward disc 28 from the extension 140. About core sleeve 138 is the energizing winding 152. A stationary sleeve 134 of magnetic material is non-rotatably mounted to extend from an end adjacent core sleeve 138 to a boss 146 having a face in close proximity to disc 28 so as to leave a narrow air gap in the electromagnetic circuits. Radially outwardly of boss 146 is mounted non-magnetic material 148, and mounted radially outwardly thereon is a cylinder 150 of magnetic material extending from close proximity to disc 28 to the close proximity to and just inwardly of flange 142. When winding 152 is energized and winding 52 is not energized, when magnetic flux travels through the path defined by: the core sleeve 138, the stationary sleeve 134, the boss 146, disc 28, cylinder 150, flange 142, extension 140 and back to core sleeve 138. Thus when winding 152 is energized, disc 28 is pulled by the magnetic force toward boss 146, non-magnetic material 148 and cylinder 150, to tend to cause the disc 28 to be stopped. Frictional engagement between member 146 and disc 28 is assisted by facing members 153 of frictional material located on the disc adjacent faces of members 146, 148, and 150.

If desired the members 148, 153 may be replaced by a single member of the combined shapes of the members replaced, made of frictional material.

For simplicity in construction of the brake member and of winding the coil, the flange 142 may be eliminated. For simplicity of construction it is possible, when desirable, to make the member 146 with the members 138 and 140 as a single integral member.

Although the brake member is electromagnetically equivalent in construction to the clutch, components are made non-rotatable about shaft 26. The brake assembly is, however, made slidable on shaft 26 (being keyed against rotation as indicated by the broken away portion of FIGURE 2). A plate 154 on the brake assembly on the side remote from disc 28 is in contact with the free end of a spring 156 mounted in the frame as shown. If desired, and for economy and cheapness of design, the plate 154 may be eliminated, and the spring designed to bear directly on the brake assembly member 140. The spring 156 is adjusted to bias the frictional surfaces of the brake assembly against disc 28 and thus, in turn, the disc 28 against the frictional surfaces of the clutch. In this way constant contact under all control conditions, between the disc 28 and the frictional surfaces of each of the clutch and the brake members is achieved.

Thus in operation and with a pinch roller 22 as shown in FIGURE 1 bearing on the tape and capstan, when it is desired to cause the tape to move, the pinch roller is lowered, and energization is applied to the clutch energizing winding 52 (with winding 152 deenergized) which provides a magnetic path, as previously indicated, to increase the pressure of the disc 28 against the rotating frictional surfaces of the clutch assembly relative to the pressure of the disc 28 on the brake frictional surfaces so that rotation of disc 28 is achieved, and this rotation is transmitted through the capstan 18 surface to the tape. On the other hand, when it is desired to halt the movement of the tape, the clutch winding 52 is de-energized and the brake winding 152 is energized to increase the frictional pressure of the disc 28 on the stationary frictional surfaces relative to the pressure of the disc 28 on the clutch surfaces; whereby the rotation of the disc 28 and the consequent tape motion will be halted.

By the mounting of the capstan 18 directly on disc 28 the consequent reduction in inertia in specific installations has reduced stopping and starting times to below 1.0 millisecond. In terms of tape reader response this represents a "stop on character" capability from a free run speed of 1000 characters a second or 100 in. per second tape speed.

It will also be realized that because the tape drive or capstan surface is located radially outwardly on the disc, the compactness of design is increased, the heat dissipation of heat generated at the frictional contacts is assisted, and the balancing requirements for the disc and tape drive surfaces are reduced all as previously described.

In the invention as discussed in the specific embodiment, the novel design has permited the reduction in the number of bearings to three. Furthermore alignment problems are reduced in the novel construction and in the specific embodiment, the stationary shaft 26 is simple and forms the basic alignment member.

It will be noted further that the brake is, by reason of its construction and mounting, self aligning and due to the spring loading, through spring 156, automatically compensates for disc and friction surface wear.

As shown in the drawings the device may be easily dismantled for inspection and maintenance. All that is required is the removal of the frame end plate after removing the nuts shown and with it the spring 156 mounted thereon; and thereafter removal of the brake and brake assembly.

The friction surfaces of the clutch and brake can be easily refinished if excessive disc or friction surface wear occurs. All that is required is a disc of magnetic material coated on one side, or on both sides with an abrasive and designed to be mechanically interchangeable with the drive disc and capstan. The drive disc and capstan are then replaced by the abrasive disc. The drive is then successively operated with brake on, clutch off and with brake off, clutch on to resurface the clutch and brake respectively. A new disc (or the old if still suitable) could then be installed and this operation may easily be performed in the field.

To gain full advantage from the low inertia drive elements, provision should be made for fast response of the actuating system comprising the clutch and the brake.

The clutch and brake should preferably be made of low core loss material having: high resistivity, low retentivity, high permeability and a flat hysteresis loop, such as silicon steel.

It is further preferable to slot the clutch and the brake to eliminate annular rings of continuous conductive material. A single slot completely through the rings in the plane of the axis prevents a major circulating or eddy current from developing. Such an eddy current causes a delay in the rise or decay of magnetic flux, even though the coil currents are switched very rapidly.

For very high speed operation, additional partial slotting of the clutch and brake reduces local eddy currents and improves the response time considerably. Slotting is of course effective only when the magnetic material is of relatively low resistivity.

The inductance of the clutch and brake coils is important and should be low to permit fast current rise in the coils.

As previously explained, the applicant does not want to be limited by the specific features of the embodiment described and specifically notes that the shape and form of the disc may be varied as desired; the means for controlling differential pressure on the disc need not be electromagnetic but may be controlled in another manner, including mechanical; the disc need not be in rubbing contact with the control surfaces if frictional connection is achieved through a fluid having viscosity; the control members may be respectively: rotating and stopped, as shown, contra-rotating or rotating in general at different speeds; and in general the applicant desired to be limited only as set out in the appended claims.

I claim:

1. A clutch-brake drive, wherein a power take-off member is rotatably mounted on a frame, said power take-off member having surfaces of revolution facing generally in opposite directions relative to the axis of said rotatably mounted member, a pair of control members mounted on said frame on opposite sides of said power take-off member, said pair of control members each having surfaces of revolution facing, respectively, the surfaces of revolution of said power take-off member, for frictional connection therewith, means continuously biasing each of said control members into frictional connection with the facing surface of said power take-off member;

control means for varying the relative strength of said frictional connections on opposite sides of said power take-off member;

a tape drive surface mounted on said power take-off member radially outwardly from said power take-off member surfaces;

said surface facing radially outwardly from the axis of revolution of said power take-off member, shaped to frictionally drive a tape and being wider measured along said axis than the distance between said surfaces of revolution;

means for causing relative rotation between said control members.

2. In a tape drive, an electrically actuable clutch-brake drive wherein a stationary brake and a rotatable drive member are each normally biased into relatively rotatable frictional contact with a power take-off member located between them;

said power take-off member being provided with a tape drive surface mounted thereon radially outward of the rotatable mounting thereof, said surface facing radially outwardly from the axis of revolution of said power take-off member, shaped to frictionally drive a tape and being wider measured along said axis than the power take-off member where frictionally contacted; and a means for controlling the relative frictional connection of said power take-off member to, respectively, said clutch and brake members;

means on said clutch member to allow the rotation thereof.

3. Means for propelling tapes comprising:

a rotatably mounted power take-off member;

a control member on each side of said power take-off member;

a surface on said power take-off member corresponding to and facing each control member;

a surface on each control member facing and designed to make relative rotational frictional connection with the respective facing surface of said power take-off member;

whereby there are two pairs of facing surfaces each pair comprising one surface on a control member and one surface on the power take-off member;

means for creating continual frictional pressure between each pair of facing surfaces;

means for creating relative rotation between said control means;

means for selectively increasing the frictional pressure between one of said pairs of facing surfaces relative to the other of said pairs;

and a tape drive surface mounted on said power take-off member, outwardly of said power take-off member surfaces.

References Cited

UNITED STATES PATENTS

| | | | |
|---|---|---|---|
| 2,692,353 | 10/1954 | Mason et al. | 192—14 X |
| 2,800,209 | 7/1957 | Winz | 192—14 |
| 3,116,000 | 12/1963 | Wales | 226—188 X |
| 3,315,860 | 4/1967 | Adams et al. | 226—188 X |

ALLEN W. KNOWLES, *Primary Examiner.*

U.S. Cl. X.R.

226—145, 188; 192—14